Dec. 9, 1941.  D. B. SCOTT  2,265,930
WELDING SYSTEM
Filed July 12, 1940
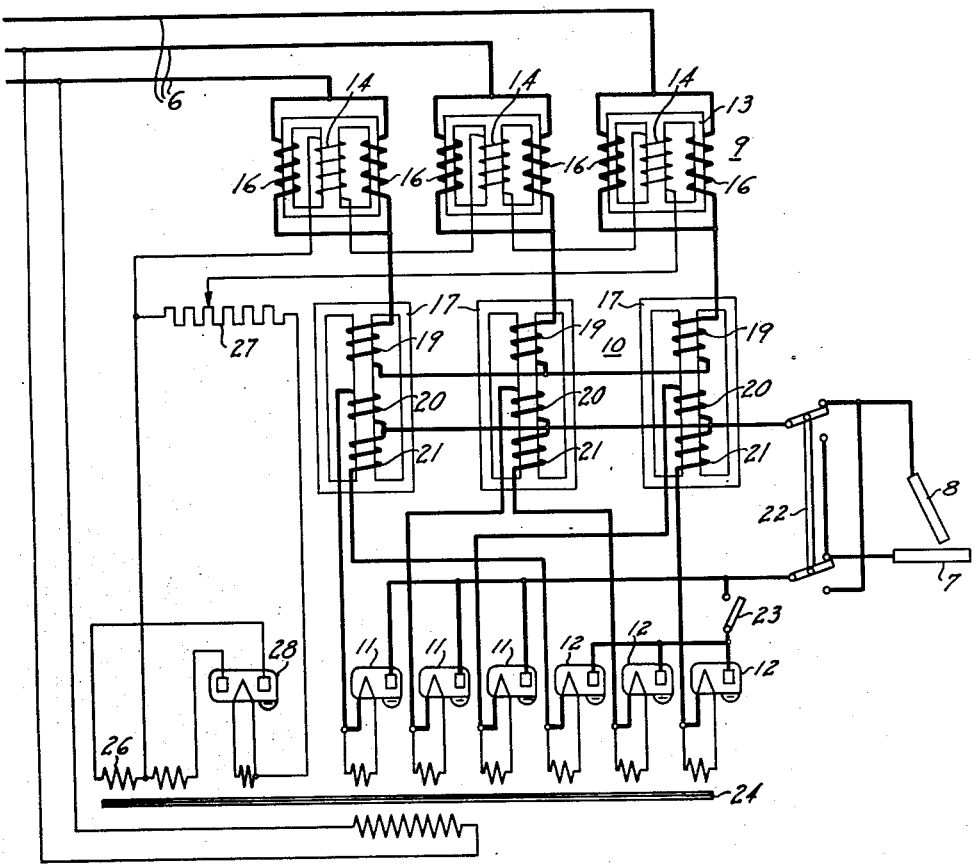
Fig. 1
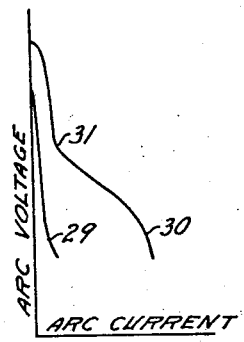
Fig. 2
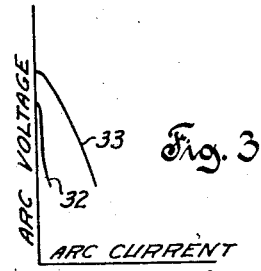
Fig. 3
Inventor
D. B. Scott
Attorney Patented Dec. 9, 1941

2,265,930

UNITED STATES PATENT OFFICE 2,265,930

WELDING SYSTEM

Donald B. Scott, West Allis, Wis., assignor to Allis-Chalmers Manufacturing Company, Milwaukee, Wis., a corporation of Delaware Application July 12, 1940, Serial No. 345,032

12 Claims. (Cl. 219—8)

This invention relates in general to welding systems and more particularly to an arc welding system operable efficiently within a wide range of current intensities including such low currents as to permit welding of thin sheets of ferrous and other metallic materials.

Electric arc welding machines are generally provided with adjusting means permitting to select the desired value of welding current within the operating range of the machine. The range of regulation obtained is, however, restricted; the ratio between the highest and the lowest stable welding current given by any machine usually being less than ten to one. The lowest currents obtainable are usually of the order of twenty to thirty amperes, but such currents frequently cannot be used because of the lack of stability of the arc. Static welding systems utilizing tapped transformers or reactors likewise are limited to a relatively narrow range of regulation for reasons of cost and they also fail to supply table welding currents below twenty amperes.

The above disadvantages may be obviated by utilizing an arrangement in which alternating current regulated by means of adjustable reactors is rectified by a system comprising a transformer and a plurality of electric valves. To obtain stable welding current of low values the transformer core may be caused to become saturated, the transformer then drawing an increased magnetizing current causing the value of the welding current to decrease beyond the range determined by the characteristics of the reactors. The arc is then so stable that it may be lengthened to a point where the arc fails to transfer metal between the welding electrodes.

It is therefore an object of the present invention to provide a welding system producing stable welding currents of less than twenty amperes.

Another object of the present invention is to provide a welding system comprising common regulating means for obtaining two ranges of regulation.

Another object of the present invention is to provide a welding system producing stable welding current continuously variable between values in a ratio greater than ten to one.

Another object of the present invention is to provide an arc welding system in which the arc may be lengthened sufficiently to preclude transfer of metal between the electrodes by the arc.

Objects and advantages other than those above set forth will be apparent from the following description when read in connection with the accompanying drawing, in which:

Fig. 1 diagrammatically illustrates one embodiment of the present invention adapted to convert three phase alternating current into direct welding current;

Fig. 2 is a graph showing two of the arc characteristics obtained by means of the embodiment illustrated in Fig. 1 when all valves of the system are utilized; and Fig. 3 is a graph showing two of the arc characteristics obtained when one-half of the valves of the system are utilized.

Referring more particularly to the drawing by characters of reference, reference numeral 6 designates a three phase low voltage alternating current supply circuit such as are usually available for the supply of current to welding systems. Welding current is to be supplied to a pair of welding electrodes 7, 8 of which electrode 7 is assumed to be the work to be welded. Electrode 8 is a rod supplying the metal for the weld, preferably a coated rod. The electrodes are connected with circuit 6 through means for converting current from the circuit 6 into direct current and for supplying the direct current to the electrodes, such means comprising a plurality of inductive reactors 9, a suitable three phase transformer aggregate 10 and two groups of electric valves 11, 12.

Each reactor 9 comprises a three legged core 13 of which the middle leg carries a saturating winding 14 for impressing a unidirectional magnetomotive force on the core to control the magnetization thereof. The inductive winding 16 of the reactor is divided into two portions arranged on the outer legs of the core and connected either in series or in parallel to cause the winding to present the same reactance to both half cycles of the flow of current therethrough. Transformers 10 comprise a plurality of magnetically independent cores 17 preferably presenting a uniform cross section to the flow of magnetic flux therethrough. Each core 17 is wound with one of the portions of a primary winding 19 defining a phase thereof and with two secondary winding portions 20, 21 defining two opposite phases. The phase portions of winding 19 are connected in star and the terminals thereof are severally connected with the conductors of circuit 6 through windings 16 of reactors 9. The neutral point of winding 19 is not connected with circuit 6.

The phase portions of winding 20 are connected in star to define a neutral point connected with one of electrodes 7, 8 through one of the blades of a double pole reversing switch 22. The terminals of winding 20 are severally connected with the cathodes of valves 11, which are preferably of the hot cathode mercury vapor type. The anodes of valves 11 are connected with the other one of electrodes 7, 8 through the second blade of switch 22. The phase portions of winding 21 are connected in star to define a neutral point connected with the neutral point of winding 20. The terminals of winding 21 are severally connected with the cathodes of valves 12, which are similar to valves 11. Winding 21 may be operatively disconnected from electrodes 7, 8 by means of a single pole switch 23 inserted in the common connection between switch 22 and the anodes of valves 12 to thereby render winding 21 inoperative. The cathode filaments of valves 11, 12 are energized from any suitable sources such as secondary windings of a transformer 24 connected with circuit 6. Transformer 24 may also be provided with an additional secondary winding 26 supplying current to a voltage divider 27 through a suitable rectifying device 28. Windings 14 are connected in series between a terminal and the tap of voltage divider 27 to vary the degree of magnetization of cores 13.

The dimensions of the different elements of the system above described vary with the magnitude of the welding current to be obtained, but such dimensions should be correlated and maintained within predetermined limits to obtain the desired results from the system. For example, let it be assumed that a range of welding current of five to seventy-five amperes be desired. If coated electrodes are used, the arc voltage may be assumed to be twenty-five volts. If circuit 6 operates at a voltage of 230 volts, at no load each phase portion of winding 19 will receive a maximum voltage of substantially 133 volts. The windings of transformer 10 should be so wound that at no load each phase portion of windings 20, 21 has induced therein a voltage of substantially sixty volts. The no load maximum flux density in cores 17 should be of the order of 11,500 gausses and the no load magnetizing current of the transformers is of the order of 1 ampere. Reactors 9 have preferably a reactance of substantially ten ohms, which may gradually be reduced to one ohm by suitable adjustment of the flow of current through windings 14.

In operation, circuit 6 being energized from a suitable source (not shown), switch 22 is left in the position shown or is reversed depending on the nature of the coating of electrode 8. When welding currents within a range reaching relatively high intensities are desired, switch 23 is closed to operatively connect valves 12 and winding 21 with the electrodes. The phase voltages of circuit 6 are impressed on the different portions of winding 19 through windings 16, inducing a six phase system of voltages in the phase portions of windings 20, 21. The latter voltages are sequentially impressed on electrodes 7, 8 through valves 11, 12.

The welding arc is ignited by momentarily engaging electrode 8 with electrode 7 and is thereafter maintained by withdrawing electrode 8 to a distance from electrode 7. The anodes of valves 11, 12 are maintained at a common potential by the connection therebetween. The cathodes of the different valves, however, are sequentially brought to a negative potential with respect to the common anode potential by the voltages of associated portions of windings 20, 21. The cathode momentarily having the most negative potential carries current and the flow of current is transferred from cathode to cathode in the sequence in which the different cathodes reach the lowest negative potential. The different cathode currents combine at the neutral point of windings 20, 21 to form a flow of unidirectional current supplied to electrodes 7, 8 to maintain the arc therebetween.

Although the flow of current through the different valves is initiated in sequence, the periods of conduction of the valves overlap to an extent depending on the value of the welding current and on the reactance of reactors 9. The voltage between electrodes 7, 8 is equal to a voltage proportional to the induced voltage of windings 20, 21 less the arc drop in valves 11, 12, which amounts to approximately 7 volts. The voltage of windings 20, 21, however, varies continuously from no load to normal load conditions obtained when the electrodes carry normal welding current. The relation between the arc current and the voltage across the arc when the arc length is increased from normal to a length causing its extinction is represented by a curve such as curve 29 of Fig. 2 when the saturating windings 14 are not supplied with current from voltage divider 27. During such operation valves 11, 12 operate without material overlap and current therefore flows generally through only one of the valves. The lowest point of the curve corresponds to normal welding conditions at twenty-five volts arc voltage with the lowest welding current obtainable when all the valves are utilized.

If the tap of voltage divider 27 is moved to the right hand terminal of the voltage divider, windings 14 receive a maximum rectified current from winding 26 through rectifying device 28. The reactance of windings 16 is thereby reduced to a minimum value and the arc current flows under a voltage represented by curve 30 corresponding to a welding current of maximum value. With this adjustment of voltage divider 27, if the arc current is maintained comparatively low by excessive lengthening of the arc, the different valves 11, 12 operate in the sequence of the voltages of winding portions 20, 21 as with the low current adjustment above described.

If the arc current is allowed to exceed a predetermined critical value, the operation of the system becomes somewhat different from the above. Winding 20 and valves 11 operate as a three phase system in which the valves carry current in the sequence of the voltages of the associated portions of winding 20 to supply current to the arc. At the same time winding 21 and valves 12 operate as another three phase system in which valves 12 carry current in the sequence of the voltages of winding portion 21 independently of winding 20 and of valves 11. The periods of operation of valves 11 overlap those of valves 12, current flowing both through one of the valves 11 and through one of the valves 12 at every instant. When the welding current exceeds the critical load, the rate of change of the arc voltage with the current becomes smaller, causing a knee in the voltage curve at point 31. Any desired arc characteristic intermediate those represented by curves 29 and 30 may be obtained by setting the tap of voltage divider 27 at selected points intermediate the terminals of the voltage divider.

When current of relatively low intensity is desired, switch 23 is left open to render winding 21 and valves 12 inoperative. Each core 17 is then operatively associated with a primary winding portion and with a secondary winding portion of only one phase. The no load arc voltage is thereby reduced by approximately fifteen percent from the value obtained during operation with all the valves. While the flow of current through each portion of winding 20 is unidirectional, the current through the associated portion of winding 19 is alternating. Each core 17 is accordingly subjected to a residual unidirectional magnetomotive force equal to the magnetomotive force which would be produced by the flow of one-third of the welding current through the associated portion of winding 20. In addition thereto the cores are also subjected to the alternating magnetization required for inducing operating voltages from winding 19 to winding 20.

Cores 17 are so dimensioned that the maximum magnetization thereof reaches the range of so-called saturation, thereby increasing the magnitude of the magnetizing current required for obtaining the alternating component of magnetization of the cores. The saturation of the cores and hence the magnetizing current flowing from circuit 6 through windings 16 and winding 19 increase with the welding current but disproportionally thereto. Windings 16 therefore carry an alternating current component to be converted into welding current and also an alternating component serving to magnetize transformers 10. Because of the saturation of cores 17 the latter component is of sufficient magnitude to cause a material voltage drop in winding 16 to thereby control the value of the welding current. The welding current may be further controlled by varying the unidirectional magnetomotive force impressed on cores 18 by windings 14.

Cores 17 are preferably so dimensioned that the maximum magnetization of the cores is then maintained within the limits of 12,500 to 23,500 gausses regardless of the setting of voltage divider 27 and of the resulting value of the welding current. The magnetizing current drawn by transformers 10 from circuit 6 through windings 16 then reaches values ranging from the value of the current supplied from circuit 6 to be converted into welding current to twice such value. As the voltage drop in windings 16 results from the flow therethrough both of the useful current component supplying welding current and of the magnetizing current component, the current limiting effect of the reactors becomes greatly increased over that obtained during operation with all the valves 11, 12. Without increase in the cost of the system it is therefore possible to decrease the welding current considerably below the lowest value which could be obtained during operation with all the valves or during operation with only valves 11 without saturation of transformer 10.

The maximum magnetization of cores 17 is designed to reach at least a value of 12,500 gausses because at lower values the magnetizing current of the transformers is too low to influence materially the current limiting effect of reactors 9. When the magnetization of the transformers exceeds the value of 23,500 gausses, the core losses of the transformers become excessive. The system then becomes impractical because of the cost of the energy dissipated in such losses and because of the difficulty of removing the heat thereby evolved in the cores. When the transformers 10 are magnetized within the limits specified, opening of switch 23 causes the welding current to decrease by substantially one-half of the value thereof previously obtained by adjustment of voltage divider 27.

Curve 32 in Fig. 3 represents the arc voltage obtained by means of valves 11 alone when windings 14 are without saturating current. The normal arc current has a value of five amperes, for which an electrode 8 having a diameter of one thirty-second of an inch is required. By saturating reactors 9 current up to 35 amperes may be obtained for which electrodes up to one-sixteenth of an inch in diameter may be utilized. Curve 33 represents the arc voltage obtained when reactors 9 are saturated by a maximum flow of current through windings 14. Arc characteristics intermediate those represented by curves 32 and 33 may be obtained by suitable adjustment of the tap of voltage divider 27.

The arc obtained is characterized by a high degree of stability regardless of the degree of saturation of reactors 9. The arc may be used for successfully transferring weld-forming metal from the rod electrode to the work when the arc length is maintained within a predetermined range of approximately one-sixteenth of an inch to three thirty-seconds of an inch for currents ranging from five to thirty-five amperes. With the same adjustment of reactors 9 the arc may be lengthened within another predetermined range of approximately three thirty-seconds of an inch to one-eighth of an inch without being interrupted. Because of the reduction of the current corresponding to the increase in the arc voltage and because of the dissipation of the heat of the arc through a larger arc volume, the arc is then unable to transfer metal from the rod electrode to the work. Some of the electrode metal may, however, slowly melt to form occasional drops which are separated from the rod by gravity. At higher values of current the arc length may increase up to one-eighth of an inch during transfer of metal to form a weld and up to one-half inch during operation without transfer of metal.

The welding current, which is unidirectional, is nevertheless of highly pulsating character as it is produced by a succession of sinusoidal voltage peaks each extending over 120 electrical degrees. The well known magnetic attraction exerted on the arc by magnetizable objects adjacent thereto is then also pulsating, and the resulting undesired displacement of the arc path is greatly reduced.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. A welding system comprising welding electrodes, an alternating current supply circuit, means for converting current from said circuit into direct current and for supplying said direct current to said electrodes, said means comprising electric valve means and transformer means provided with associated cores and windings, inductance means connecting said transformer means with said circuit, and means comprising the dimensioning of said cores and the arrangement of said windings on said cores for subjecting said cores to a unidirectional magnetomotive force component causing the magnetization of said cores to reach saturation, thereby increasing the flow of current from said circuit to said transformer means through said inductance means to control the value of the welding current.

2. A welding system comprising welding electrodes, an alternating current supply circuit, means for converting current from said circuit into direct current and for supplying said direct current to said electrodes, said means comprising electric valve means and transformer means provided with associated cores and windings, inductance means connecting said transformer means with said circuit, and means comprising the dimensioning of said cores and the arrangement of said windings on said cores for causing said transformer means to draw a magnetizing current component greater than the current component supplied from said alternating current circuit to be converted into said direct current to thereby increase the flow of current from said circuit to said transformer through said inductance means to control the value of the welding current.

3. A welding system comprising welding electrodes, an alternating current supply circuit, means for converting current from said circuit into direct current and for supplying said direct current to said electrodes, said means comprising electric value means and transformer means provided with associated cores and windings, inductance means connecting said transformer means with said circuit, and means comprising the dimensioning of said cores and the arrangement of said windings on said cores for causing the degree of magnetization of said cores and the magnetizing current of said transformer means to increase with the magnitude of said direct current.

4. A welding system comprising welding electrodes, a polyphase alternating current supply circuit, means for converting current from said circuit into direct current and for supplying the direct current to said electrodes, said means comprising electric valve means and transformer means provided with star connected primary and secondary windings and with a plurality of magnetically independent cores, each of said cores being associated with primary and secondary windings of only one phase for subjecting said cores to a unidirectional magnetomotive force component causing the magnetization of said cores to reach saturation, and inductance means connecting said primary winding with said alternating current circuit to control the value of the welding current in dependence upon the degree of saturation of said cores.

5. A welding system comprising welding electrodes, a polyphase alternating current supply circuit, means for converting current from said circuit into direct current and for supplying the direct current to said electrodes, said means comprising electric valve means and transformer means provided with a star connected primary winding, with a first star connected secondary winding, with a second star connected secondary winding and with a plurality of cores, each of said cores being associated with a portion of said primary winding defining one phase thereof and with a portion of said first secondary winding and a portion of said second secondary winding defining two opposite phases, and means for controlling said direct current comprising means for rendering inoperative said second secondary winding.

6. A welding system comprising welding electrodes, a polyphase alternating current supply circuit, means for converting current from said circuit into direct current and for supplying the direct current to said electrodes, said means comprising electric valve means and transformer means provided with a star connected primary winding, with a first star connected secondary winding, with a second star connected secondary winding and with a plurality of cores, each of said cores being associated with a portion of said primary winding defining one phase thereof and with a portion of said first secondary winding and a portion of said second secondary winding defining two opposite phases, inductance means connecting said primary winding with said alternating current circuit, and means for controlling the voltage drop in said inductance means to regulate the magnitude of said direct current comprising means for rendering inoperative said second secondary winding to cause said circuit to supply additional magnetizing current to said primary winding through said inductance means.

7. A welding system comprising welding electrodes, a polyphase alternating current supply circuit, means for converting current from said circuit into direct current and for supplying the direct current to said electrodes, said means comprising electric valve means and transformer means provided with a star connected primary winding, with a first star connected secondary winding, with a second star connected secondary winding and with a plurality of cores, each of said cores being associated with a portion of said primary winding defining one phase thereof and with a portion of said first secondary winding and a portion of said second secondary winding defining two opposite phases, inductance means connecting said primary winding with said alternating current circuit, and means for controlling the voltage drop in said inductance means to regulate the magnitude of said direct current comprising means for varying the inductance of said inductance means and means for rendering inoperative said second secondary winding to cause said circuit to supply additional magnetizing current to said primary winding through said inductance means.

8. A welding system comprising welding electrodes, a polyphase alternating current supply circuit, means for converting current from said circuit into direct current and for supplying the direct current to said electrodes, said means comprising electric valve means and transformer means provided with star connected primary and secondary windings and with a plurality of magnetically independent cores, each of said cores being associated with primary and secondary windings of only one phase, means comprising the dimensioning of said cores for causing the magnetization of said cores to become dissymmetrical and to reach a maximum value comprised between 12,500 and 23,500 gausses to increase the magnetizing current of said transformer, and inductance means connecting said primary winding with said alternating current circuit to control the value of the welding current in dependence upon the value of said magnetizing current.

9. A welding system comprising a source of alternating current, welding electrodes, means for connecting said electrodes in circuit with said source to produce an arc carrying a welding current between said electrodes, and means for causing said arc to transfer metal between said electrodes when said arc is of a length within a predetermined range and for causing said arc to fail to transfer metal between said electrodes when said arc is of a length within another predetermined range, the last said means comprising means inserted in the connections between said circuit and said electrodes for converting alternating current from said circuit into direct current to be supplied to said electrodes.

10. A welding system comprising a source of alternating current, welding electrodes, and means connecting said electrodes in circuit with said source operable for producing an arc carrying a welding current between said electrodes for causing said arc to transfer metal between said electrodes when said arc is of a length within a predetermined range and for causing said arc to fail to transfer metal between said electrodes when said arc is of a length within another predetermined range.

11. A welding system comprising a source of alternating current, welding electrodes, means for connecting said electrodes in circuit with said source to produce an arc carrying a welding current between said electrodes, and means for causing said arc to transfer metal between said electrodes when said arc is of a length within a predetermined range and for causing said arc to fail to transfer metal between said electrodes when said arc is of a length within another predetermined range, the last said means comprising inductance means, transformer means and electric valve means inserted in the connections between said circuit and said electrodes for converting alternating current from said circuit into direct current to be supplied to said electrodes.

12. The method of welding comprising passing an alternating current component through a reactor winding, converting the current component into welding current, passing the welding current through welding electrodes, controlling the magnetization of the reactor by impressing on the reactor core a unidirectional magnetomotive force, and further controlling the magnetization of the reactor by passing through the reactor winding another alternating current increasing disproportionately to the welding current.

DONALD B. SCOTT.

CERTIFICATE OF CORRECTION.

Patent No. 2,265,930.                                December 9, 1941.

DONALD B. SCOTT.

It is hereby certified that error appears in the printed specification of the above numbered patent requiring correction as follows: Page 4, first column, line 27, claim 3, for "value" read --valve--; and that the said Letters Patent should be read with this correction therein that the same may conform to the record of the case in the Patent Office.

Signed and sealed this 27th day of January, A. D. 1942.

(Seal)

Henry Van Arsdale,
Acting Commissioner of Patents.